(12) United States Patent
Gujarathi et al.

(10) Patent No.: US 11,658,984 B2
(45) Date of Patent: May 23, 2023

(54) AUTHENTICATING ACCESS TO COMPUTING RESOURCES

(71) Applicant: Citrix Systems, Inc., Fort Lauderdale, FL (US)

(72) Inventors: Ashish Gujarathi, Parkland, FL (US); Ricardo Fernando Feijoo, Davie, FL (US)

(*) Notice: Subject to any disclaimer, the term of this patent is extended or adjusted under 35 U.S.C. 154(b) by 365 days.

(21) Appl. No.: 16/857,987

(22) Filed: Apr. 24, 2020

(65) Prior Publication Data

US 2021/0336966 A1    Oct. 28, 2021

(51) Int. Cl.
*H04L 29/06* (2006.01)
*H04L 9/32* (2006.01)
*H04L 9/40* (2022.01)

(52) U.S. Cl.
CPC .......... *H04L 63/108* (2013.01); *H04L 9/3247* (2013.01); *H04L 63/0876* (2013.01); *H04L 2463/082* (2013.01)

(58) Field of Classification Search
CPC . H04L 63/108; H04L 63/0876; H04L 9/3247; H04L 2463/082
See application file for complete search history.

(56) References Cited

U.S. PATENT DOCUMENTS

| | | | | |
|---|---|---|---|---|
| 2016/0352524 A1* | 6/2016 | Kinney | ............... | H04L 63/0876 |
| 2017/0099148 A1* | 4/2017 | Ochmanski | .......... | H04L 9/3247 |
| 2019/0364035 A1* | 2/2019 | Smolny | ................. | H04L 63/108 |
| 2019/0327223 A1 | 10/2019 | Kumar et al. | | |
| 2019/0372993 A1* | 12/2019 | Dunjic | ................. | H04L 9/3268 |
| 2021/0288808 A1* | 9/2021 | Bahety | ................ | H04L 63/0846 |

OTHER PUBLICATIONS

Faynberg, I, et al., "On dynamic access control in Web 2.0 and beyond: Trends and technologies", Bell Labs Technical Journal, Wiley, CA, US, vol. 16, No. 2, Sep. 1, 2011 (Sep. 1, 2011), pp. 199-128, 199-218, XP011627618, ISSN: 1089-7089, DOI: 10.1002/BLTJ.20511, [retrieved on Mar. 15, 2014].
International Search Report for PCT Appl. No. on PCT/US2021/027430 dated Aug. 2, 2021.

(Continued)

*Primary Examiner* — Mohammad A Siddiqi

(57) ABSTRACT

Described embodiments provide systems, methods, computer readable media for accessing services via identity providers. A computing device may transmit, responsive to a request from a client to access a service, a value to the client. The client may be configured to access the service using an access token. The computing device may receive, from the client, a signature, the signature generated using the value, a device identifier, and a first encryption key. The computing device may determine, using the value and a second encryption key, the device identifier from the signature. The computing device may identify a status of the client according to the device identifier. The computing device may provide, responsive to the status, a new access token to permit access to the access and a refresh token to obtain subsequent access tokens.

14 Claims, 9 Drawing Sheets

(56) References Cited

OTHER PUBLICATIONS

Sumitra Binu et al.: "A Mobile Based Remote User Authentication Scheme without Verifier Table for Cloud Based Services", Women in Computing and Informatics, ACM, 2 Penn Plaza, Suite 701 New York NY 10121-0701 USA, Aug. 10, 2015 (Aug. 10, 2015), pp. 502-509, XP058073381, DOI: 10.1145/2791405.2791487, ISBN: 978-1-4503-3361-0, section 3.2.2.

Unknown: "Copyright (C) 2014 Network Radius Sarl the Freeradius Technical Guide Chapter 1—Introduction What is Freeradius?", Jan. 1, 2014 (Jan. 1, 2014), pp. 1-58, XP055827077, Retrieved from the Internet: URL:https://networkradius.com/doc/FreeRADIUS%20Technical%20Guide.pdf [retrieved on Jul. 22, 2021] section 2.3.

Zhu, et al: "RFC 4556—Public Key Cryptography for Initial Authentication in Kerberos (PKINIT)", Jun. 30, 2006 (Jun. 30, 2006), pp. 1-84, XP055373727, Retrieved from the Internet: URL:https://tools.ietf.org/html/rfc4556#section-3.2 [retrieved on May 17, 2017] abstract.

International Preliminary Report on Patentability on PCT Appl. No. dated Nov. 3, 2022 (8 pages).

\* cited by examiner

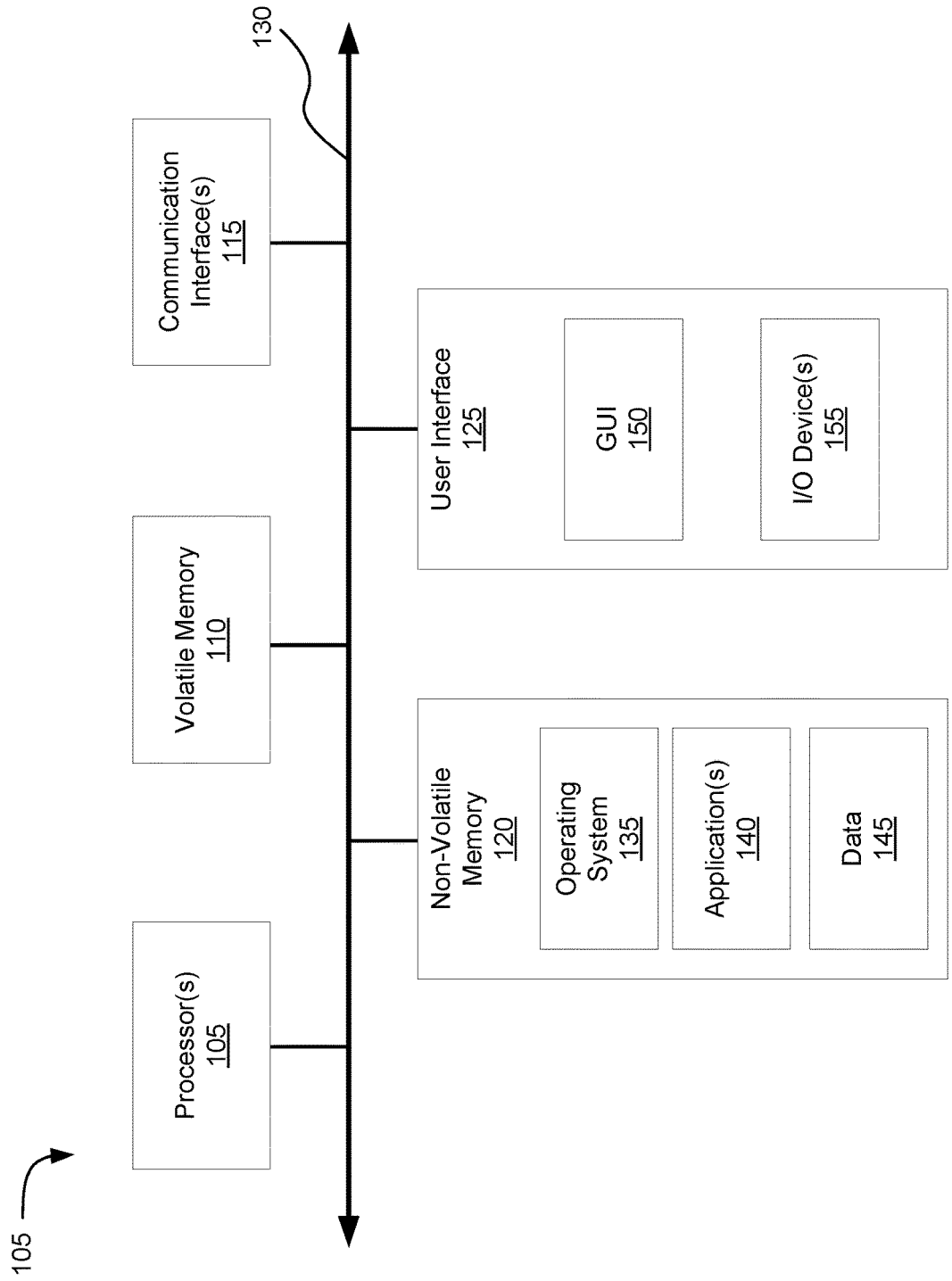

AUTHENTICATING ACCESS TO COMPUTING RESOURCES

FIELD OF THE DISCLOSURE

The present application generally relates to accessing services, including but not limited to systems and methods of authenticating access to computing resources.

BACKGROUND

Prior to accessing certain applications, a client may undergo an authentication process. During this process, the user may be prompted by the client to enter credential information, such as an identifier and a passcode. Once the credential information is entered, a server may verify the credential information for accessing the resources for the application. Upon verification, the client may be permitted to access resources.

BRIEF SUMMARY

Authentication of a user may help in securing and controlling access by a client operated by the user and a resource hosted on a server. However, performing authentication each time the user is attempting access the resource may result in a poor-quality experience to, especially when the client is of a small form factor (e.g., a smartphone or a smart watch). For example, the user may become frustrated at the frequent prompts for entry of credential information (e.g., account identifier and password), and may forego use of the application or accessing the resources for the application. To maintain security while striking a balance with user convenience, an identity provider (sometimes referred herein as an identity broker) may provide the ability to extend an effective duration of an authentication session by using access tokens that can be refreshed or extended.

One approach, for example, may be based on the OAuth2 specification. The OAuth 2 specification may define a pattern and specify a protocol for use of such tokens to extend the duration of the authentication session. While allowing for such extended sessions, the OAuth2 specification may be vulnerable to security lapses. For example, an enterprise security policy for a server hosting resources for an application may specify for more stringent security measures, such as multi-factor authentication, geo-fencing, and device configurations. When a client is not managed or compliant according to such enterprise security policies, the client may pose a risk to the overall service. In such a scenario, an attacker can impersonate an end-user for an extended period of time by entering stolen credentials and use tokens from a client that has not been properly secured to access resources of the server.

To address the technical issues arising from support of extended authentication sessions, the identity provider may issue and support tokens that are from clients that are managed and compliant in accordance with the enterprise policy. The identity provider may be integrated with a unified endpoint management (UEM) via an application programming interface (API). The UEM may provide support for managing clients. As part of a first time use on a client, a user of the client may install an application. The application may rely on resources hosted on a service. As part of the installation process, the application may check a local storage on the device to identify whether the client is registered with a client enrollment service (DRS).

Due to the first time use, the device may not be registered with the DRS. In response, the client may communicate with the DRS and generate a record with a unique device identifier. When the client is registered, a public-private encryption key may be generated on the client, and the public key may be provided to the DRS. In addition, the client may initiate a user authentication process. As part of the authentication process, the client may be directed to an identity provider (IDP). Because the client is not managed yet in accordance with the enterprise policy, the IDP may provide the client with an access token with a set expiration time. The IDP may forego provision of a refresh token, thereby making the access token non-refreshable.

The application running on the client may then access a service associated with (e.g., identified or otherwise available for accessed through) the application. The service may be accessible via a cloud computing environment, and may reside in a control plane of the environment. The control plane may manage communications among the client, the service, and other nodes within the cloud computing environment. The services in the control plane may prompt the user to enroll the client with a UEM integrated with the IDP. The UEM may enforce enterprise policies related to security and data integrity for the services in the control plane. The user may be guided through the enrollment process. As part of the enrollment, the client may provide the device identifier to the UEM. The UEM in turn may store, maintain, and use the device identifier to keep track of a device compliance of the client with the enterprise policies.

At some later time, when the user attempts to access any of the services of the control plane, the authentication context (including the access token) may have expired, and the client may be redirected to the IDP to re-authenticate. Under the challenge-response flow for the re-authentication, the IDP may generate and send a cryptographic nonce (or another value) to the application on the client. The client may in turn generate a digital signature using the received cryptographic nonce, the device identifier, and the private encryption key, and send the signature as part of a response back to the IDP. The IDP may verify the digital signature using the public encryption key (provided by the DRS).

Upon verification, the IDP may recover the device identifier of the client attempting to access the service. Using the device identifier, the IDP may query the UEM to identify a device compliance status (sometimes referred to as device status) for the client. When the device compliance status indicates compliance, the IDP may issue both an access token to authorize the client to access the service and a refresh token to permit the client to retrieve additional access tokens. On the other hand, when the device compliance status indicates noncompliance, the IDP may prevent issuance of the refresh token.

With the access token, the application on the client may access the service in the control plane. The access token may be short-lived, and may have an expiration time duration set within a few minutes. In contrast, the refresh token may have an expiration time duration longer than the time duration of the access token, and may be set to as long as weeks or months. The access token may be used by the service for performing authorization checks, whereas the refresh token may be used by the client to obtain additional access tokens.

Subsequently, when the user again attempts to access one of the services in the control plane, the authentication context (e.g., the access token) may have expired, but a valid refresh token is available and hence the client may be re-directed to the IDP to obtain refresh token(s). In the case where both the access token and refresh token are expired, the user of the application on the client may be prompted to enter authentication credentials to re-authenticate. The refresh token flow may be similar to the re-authentication flow, with the addition checks performed in conjunction with the issuance of both the access token and the refresh token. Under the refresh token flow, the IDP may generate and send a cryptographic nonce (or another value) to the application on the client. The client may in turn generate a digital signature using the received cryptographic nonce, the device identifier, and the private encryption key, and send the signature as part of a response back to the IDP. The IDP may verify the digital signature using the public encryption key (provided by the DRS). Upon verification, the IDP may recover the device identifier of the client attempting to access the service.

Using the device identifier, the IDP may query the UEM to identify a device compliance status for the client. In conjunction as part of the refresh flow, the IDP may perform additional checks, such as using a location to determine whether there are other devices claiming the same device identifier and re-authenticating the user using the entered authentication credentials. When the device compliance status indicates that the client is compliant, the IDP may issue both an access token to authorize the client to access the service and a refresh token to permit the client to retrieve additional access tokens. On the other hand, when the device compliance status indicates that the client is noncompliant, the IDP may determine that the refresh process has filed, and may prompt the user to re-authenticate (e.g., re-enter credentials).

In this manner, the IDP may address the potential security vulnerabilities apparent in other approaches such as the OAuth 2 specification. The IDP may ensure that applications running on clients attempting to access services may be in compliance with enterprise policies for authorization. As a result, the risks to security and the data integrity of the overall service may be reduced, while allowing for longer authentication sessions between the clients and services. Moreover, since user involvement in re-entering authentication credentials is reduced, the human-computer interaction (HCI) between the user of the client and the application relying on the resources hosted on the services of the control plane may be greatly enhanced.

Some aspects of this disclosure is directed to systems, methods, computer readable media for accessing services via identity providers. A computing device may transmit, responsive to a request from a client to access a service, a value to the client. The client may be configured to access the service using an access token. The computing device may receive, from the client, a signature, the signature generated using the value, the device identifier, and a first encryption key. The computing device may determine, using the value and a second encryption key, the device identifier from the signature. The computing device may identify or receive a status of the client according to the device identifier. The computing device may provide, responsive to the status, the access token.

In some embodiments, the computing device may issue the access token to the client for accessing the service responsive to the status indicating that the client is permitted to access the service. In some embodiments, the computing device may provide, responsive to the status, the access token and a refresh token. The access token may permit the client to access the service for a defined duration of time, and the refresh token may permit the client to obtain another access token after expiration of the access token. In some embodiments, the computing device may prevent, responsive to the status indicating that the client is noncompliant, provision of a refresh token. The refresh token may permitting the client to obtain an access token.

In some embodiments, the computing device may transmit the value responsive to determining that the access token is expired. In some embodiments, the computing device may determine, responsive to the request, that a refresh token issued to the client for obtaining an access token is unexpired. In some embodiments, the computing device may transmit, responsive to the request, that a refresh token issued to the client for obtaining an access token is unexpired. In some embodiments, the computing device may verify the signature from the client using the second encryption key. In some embodiments, the computing device may determine, using the value and the second encryption key, the device identifier from the signature responsive to verification of the signature.

Some aspects of this disclosure is directed to systems, methods, computer readable media for accessing services via identity providers. A computing device may transmit, responsive to a request from a client to access a service, a value to the client. The client may be configured to access the service using a first access token. The computing device may receive, from the client, a signature, the signature generated using the value, a device identifier, and a first encryption key. The computing device may determine, using the value and a second encryption key, the device identifier from the signature. The computing device may identify a status of the client according to the device identifier. The computing device may provide, responsive to the status, a refresh token to permit the client to obtain a second access token to replace the first access token to access the service.

In some embodiments, the computing device may provide, responsive to the status, both the refresh token and the second access token to permit the client to access the service for a defined duration of time. In some embodiments, the computing device may verify the status of the client in accordance with a security policy of the computing device. The security policy may define one or more conditions allowing issuance of the refresh token. In some embodiments, the computing device may transmit the value responsive to determining that a previous refresh token issued to the client is expire.

In some embodiments, the computing device may query a management service using the device identifier to identify the status of the client. In some embodiments, the computing device may verify the signature from the client using the second encryption key. In some embodiments, the computing device may determine, using the value and the second encryption key, the device identifier from the signature responsive to verification of the signature.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 1A is a block diagram of embodiments of a computing device;

Figure 1B:
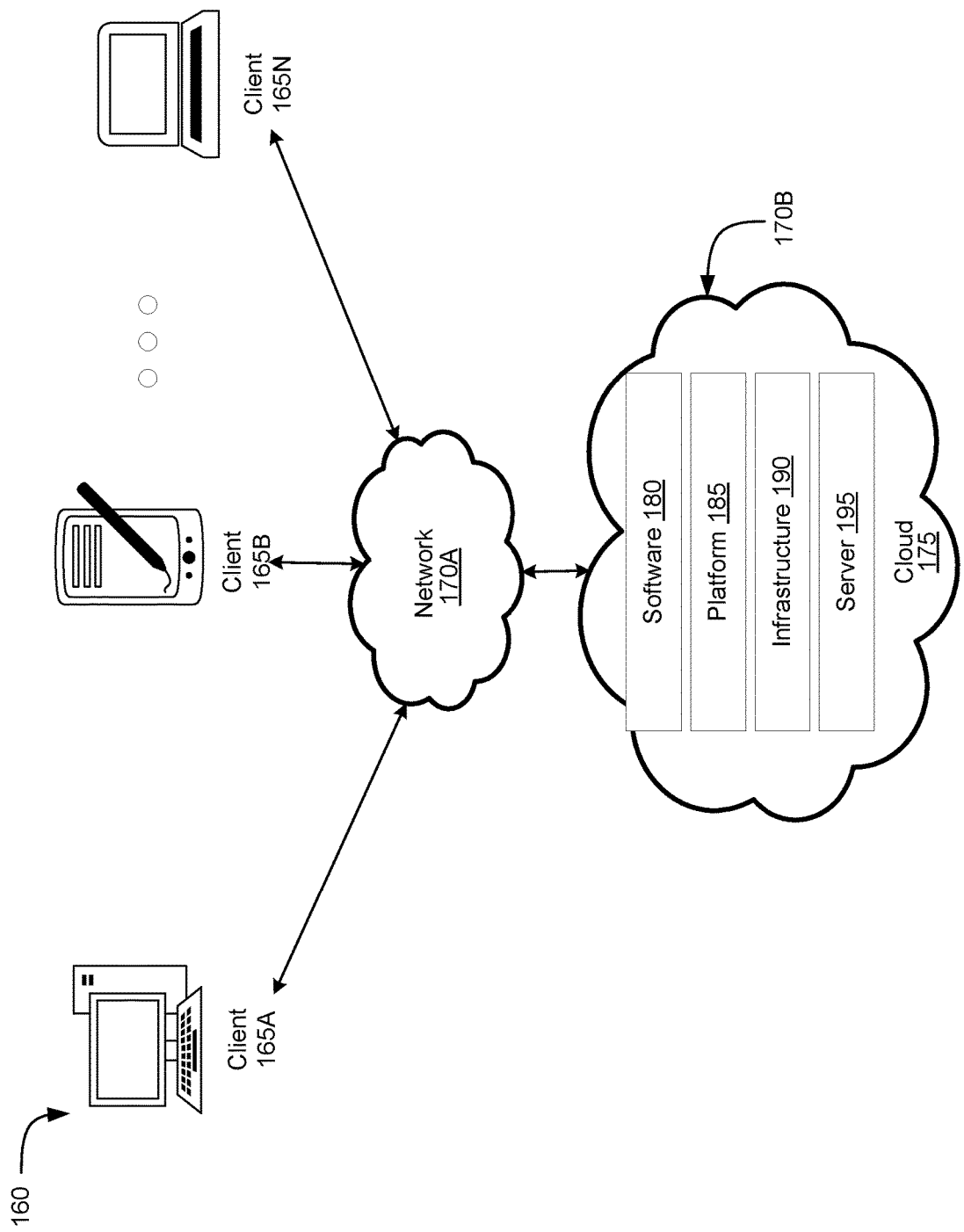
FIG. 1B is a block diagram depicting a computing environment comprising client device in communication with cloud service providers.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods of accessing services via identity providers.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 135, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 135 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
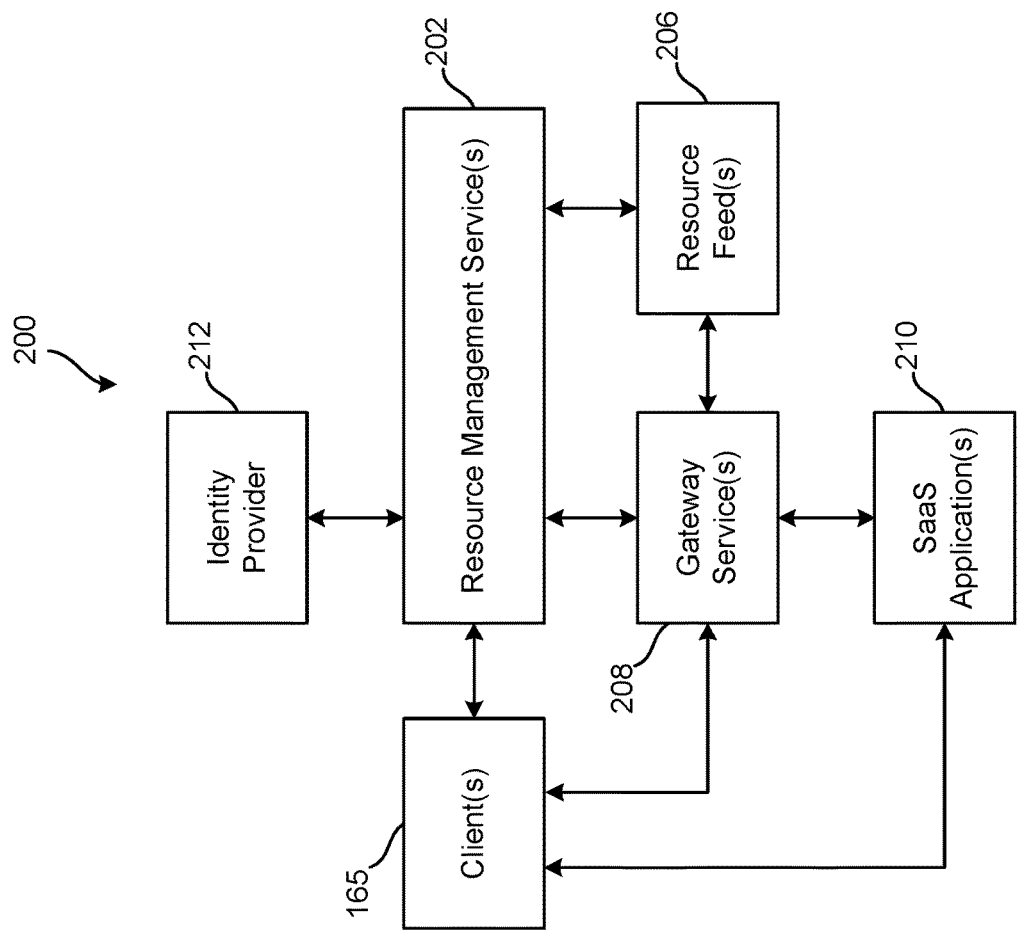
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 202 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 202 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 202, one or more file repositories and/or file sharing systems, one or more secure browser services, one or more access control services for the SaaS applications 210, one or more management services for local applications on the client(s) 202, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
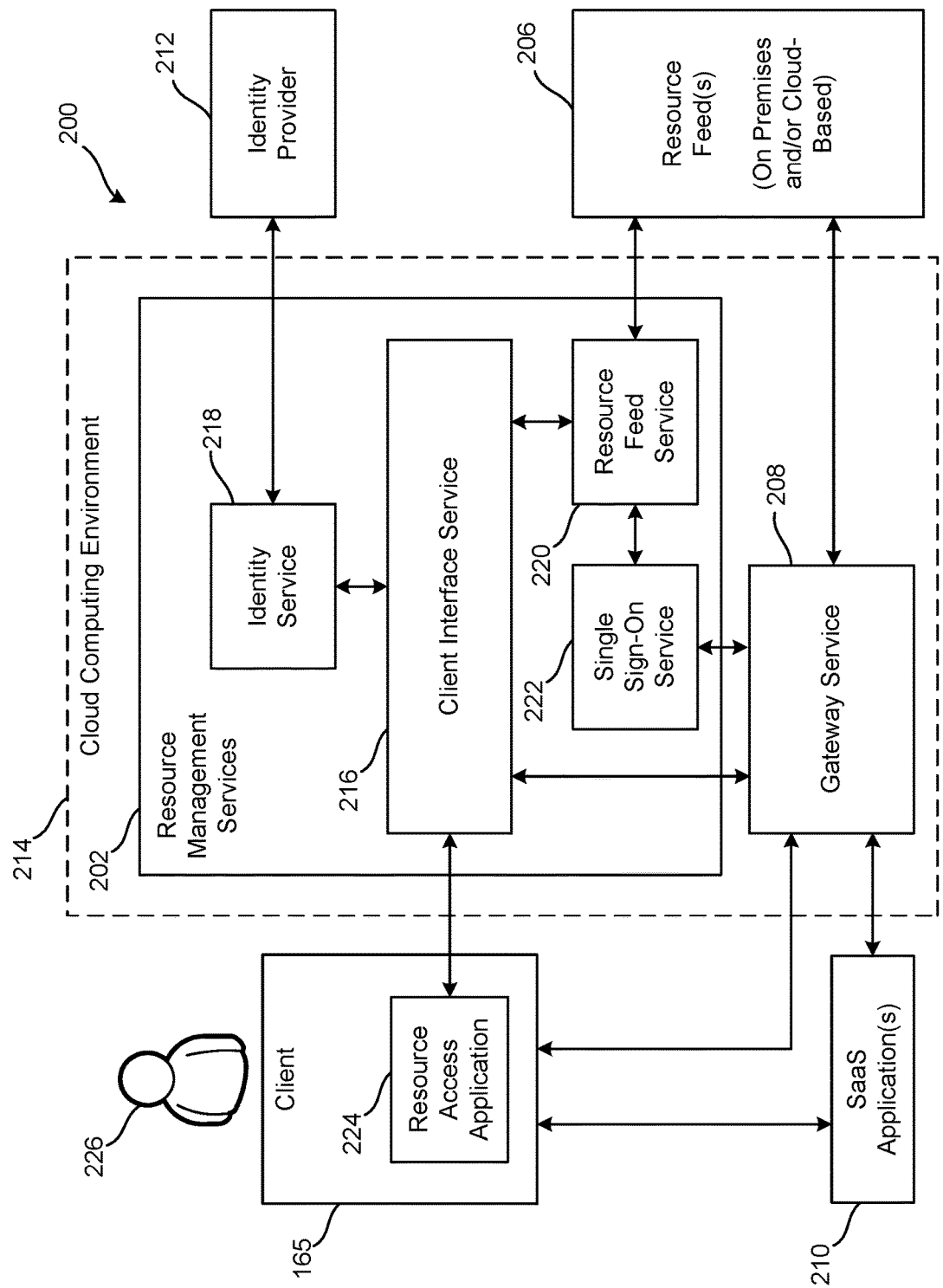
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more interne enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 226 of something that requires the user's attention (e.g., approval of an expense report, new course available for registration, etc.).

Figure 2C:
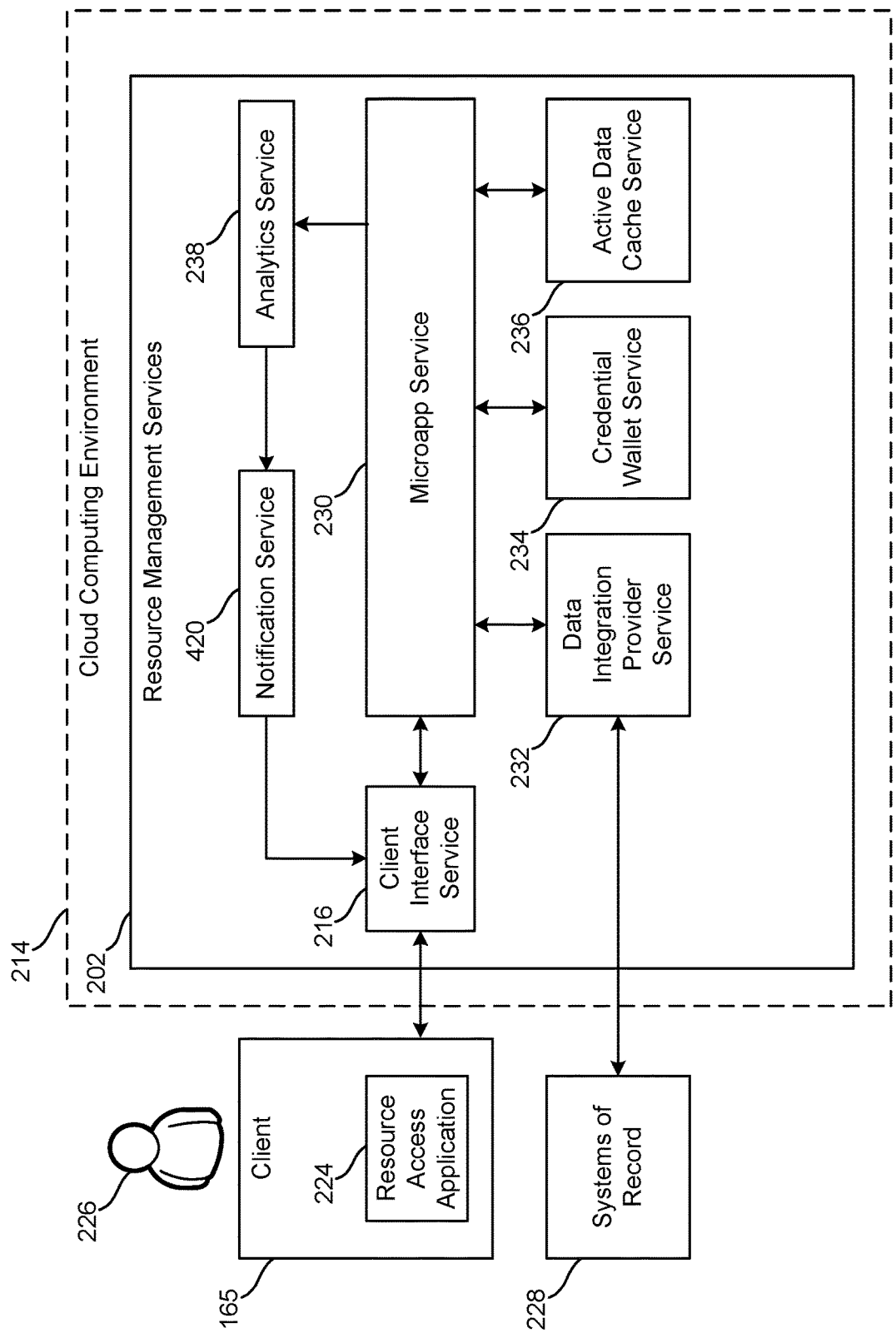
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

C. Systems and Methods of Accessing Services via Identity Providers

Figure 3:
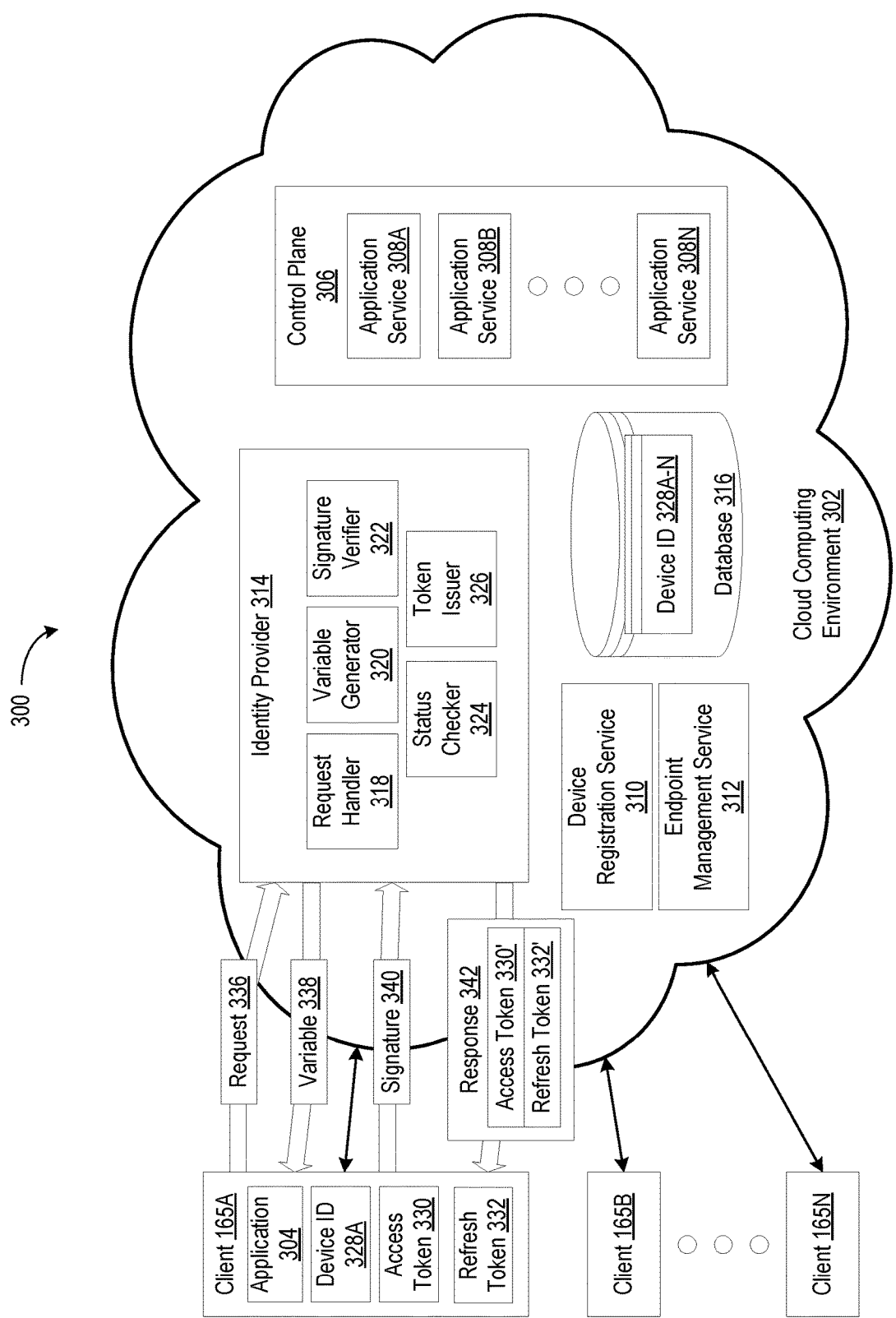
FIG. 3 is a block diagram of an embodiment of a system for accessing services via identify providers.

Referring now to FIG. 3, depicted is a block diagram of an embodiment of a system 300 for accessing services via identity providers. In overview, the system 300 may include at least one cloud computing environment 302 and one or more clients 165A-N (hereinafter generally referred to as client 165). The client 165 may execute, run, or include at least one appliance 304. The cloud computing environment 302 may include at least one control plane 306, one or more application services 308A-N (hereinafter generally referred to as application service 308) in the control plane 306, at least one device registration service 310, at least one endpoint management service 312, at least one identity provider 314, and at least one database 316, among others. The identity provider 314 may include at least one request handler 318, at least one variable generator 320, at least one signature verifier 322, at least one status checker 324, and at least one token issuer 326, among others. The cloud computing environment 305 (and the components therein) may be communicatively coupled with the clients 165.

The above-mentioned elements or entities are implemented in hardware, or a combination of hardware and software, in one or more embodiments. Components of the system 300 may be implemented using hardware or a combination of hardware or software detailed above in connection with FIGS. 1A and 1B. For instance, these elements or entities can include any application, program, library, script, task, service, process or any type and form of executable instructions executing on hardware of the client 165, the control plane 306, the application services 308, the device registration service 310, the endpoint management service 312, the identity provider 314 (including the request handler 318, the variable generator 320, the signature verifier 322, the status checker 324, and the token issuer 326), and the database 316, among others. The hardware includes circuitry such as one or more processors in one or more embodiments.

Moreover, one or more of the above mentioned elements or entities may be instances of the components detailed above in connection with FIGS. 2A and 2B. For example, the cloud computing environment 302 may be an instance of the cloud computing environment 214. The application 304 running on the client 165 may be an instance of the resource access application 224. The control plane 306 may be an instance of the resource management services 202. The application services 308 may be instances of the SaaS applications 210 and the resource feeds 206. The device registration service 310 and the endpoint management service 312 may be instances of the gateway service 208 and the client interface service 216. The identity provider 314 may be an instance of the identity service 218 or the identity provider 212. In some embodiments, the functionalities of the device registration service 310, the endpoint management service 312, and the identity provider 314 may be part of a single service or distributed across multiple services (e.g., as depicted).

In further detail, the client 165 may receive or identify the application 304 for installation and execution. The application 304 may rely on resources hosted on of the application services 308 of the control plane 306. To install the application 304, the client 165 may retrieve, identify, or otherwise receive an installation package. The installation package may include executable instructions to setup the application 304 on the client 165 and also resources for the application 304 to be stored and maintained on the client 165. The installation package may be downloaded, for example, from a file server of a software distributor for the application 304. Upon identification, the client 165 may run the installation package to unpack and setup the application 304 on the client 165.

Once installed, the application 304 may determine whether to transmit a registration request to the device registration service 310. In some embodiments, the determination of whether to send the registration request may be part of the installation process. The registration request may be to catalog or indicate the client 165 as having installed an application 304 that relies on one of the application services 308 of the control plane 306. To determine whether to transmit a registration request to the device registration service 310, the application 304 may determine or identify whether a device identifier 328A-N (hereinafter generally referred to as device identifier 328) is stored and maintained on the client 165.

The presence of the device identifier 328 on the client 165 (e.g., the first device identifier 328A for the first client 165A as depicted) may indicate that the client 165 has been registered with the device registration service 310. For example, another application 304 relying on resources hosted on one of the application services 308 of the control plane 306 may have been installed on the client 165. As a part of the previous installation, the client 165 may have received the device identifier 328 from the device registration service 310. The device identifier 328 may correspond to one of the device identifiers 328 registered, stored, or maintained on the database 316. On the other hand, the lack of the device identifier 328 on the client 165 may indicate that the client 165 has not been registered with the device registration service 310. The lack of the device identifier 328 may also indicate that the client 165 is installing an application 304 that relies on one of the application services 308 of the control plane 306 for the first time. For instance, because there were no previous installations of applications 304 that rely on the application service 308, the client 165 may not have previously received the device identifier 328 from the device registration service 310. Furthermore, there may be no device identifiers 328 on the database 316 that correspond to or uniquely reference the client 165. If the device identifier 328 is identified as stored and maintained on the client 165, the application 304 may determine to not transmit (e.g., drop or inactivate) the registration request because the stored identifier 328 is indicative of client 165 being previously registered with service 310.

On the other hand, if the device identifier 328 is identified as not stored or maintained on the client 165, the application 304 may determine to transmit the registration request. In addition, the application 304 may generate the registration request to send the device registration service 310. The registration request may include an initial identifier to reference the client 165 (or the application 304). For example, the initial identifier may include an account identifier for a user of the application 304, a network address of the client 165 (e.g., an Internet Protocol (IP) address), or a location identifier of the client 165, or any combination thereof, among others. In generating the registration request, the application 304 (or a cryptograph process on the client 165) may calculate, determine, or otherwise generate one or more encryption keys using cryptographic techniques. The cryptographic techniques may include, for example, a symmetric key (e.g., a stream cipher or a block cipher) or an asymmetric key (e.g., Diffie-Hellman key exchange, an elliptic curve cryptography, and a Rivest-Shamir-Adleman (RSA) encryption), among others. In some embodiments, when generating in accordance with the asymmetric key techniques, the application 304 may generate a public encryption key for distribution and a private encryption key to be maintained on the client 165. Upon generated, the application 304 may include at least one of the encryption keys (e.g., the public encryption key) into the registration request. The application 304 may transmit the registration request including the initial identifier and the encryption keys to the device registration service 310.

The device registration service 310 may identify or otherwise receive the registration request from the application 304 of client 165. Upon receipt from the client 165, the device registration service 310 may parse the registration request to identify the initial identifier for the client 165 and the encryption key (e.g., the public encryption key). The initial identifier may differ from the device identifier 328 to be provided by the device registration service 310. In addition, the device registration service 310 may generate a device identifier 328 for the client 165. The device identifier 328 may include, for example, a set of alphanumeric characters to uniquely reference the client 165 (or the application 304 on the client 165). The device registration service 310 may link or associate the initial identifier included in the registration request from the client 165 with the device identifier 328 for the client 165. The device registration service 310 may store and maintain the association between the initial identifier with the device identifier 328 on the database 316. In some embodiments, the device registration service 310 may use the initial identifier include in the registration request as the device identifier 328 for the client 165. The device registration 310 may store and maintain the initial identifier as the device identifier 328 on the database 316.

The device registration service 310 may package the device identifier 328 into a registration acknowledgment to be sent to the application 304. The registration acknowledgment may be an indication to the application 304 that registration of the client 165 with the device registration service 310 is complete. The registration acknowledgment may also include instructions for the client 165 to perform user authentication and to enroll with the endpoint management service 312. Upon packaging, the device registration service 310 may send or transmit the registration acknowledgment to the client 165. In conjunction, the device registration service 310 may send registration data for the client 165 to the identity provider 314. The registration data may identify or include the device identifier 328 for the client 165 and the encryption key (e.g., the public encryption key) provided by the client 165. Upon receipt, the identity provider 314 may store and maintain the device identifier 328 and the encryption key included in the registration data.

With receipt of the registration acknowledgment from the device registration service 310, the application 304 running on the client 165 may carry out or perform user authentication with the application service 308 for the application 304. In some embodiments, the user authentication may be performed in accordance with the instructions included in the registration acknowledgment from the device registration service 310. In carrying out the user authentication, the application 304 may prompt the user to enter authentication credentials, such as the account identifier and a passcode. The authentication credentials may be registered with the application service 308 for the application 304, the control plane 306 for the application services 308 to which the application 304 belong, or a separate authentication service handling authentication credentials for the application 304.

Once entered, the application 304 may send user authentication data to the application service 308 (or the control plane 306). The user authentication data may include the authentication credentials and the device identifier 328 for the client 165. The application service 308 may register, store, and maintain the user authentication data. In addition, the application service 308 may redirect the application 304 to the identity provider 314. As part of the redirection, the application service 308 may provide the device identifier 328 for the client 165 to the identity provider 314. The token issuer 326 of the identity provider 314 in turn may generate an initial access token 330. The access token 330 may permit the client 165 (or the application 304) to access the application service 308 (or the application services 308 of the control plane 306) for a defined duration of time. The defined duration of time, for example, may range from a minute to a day relative to time of issuance. The access token 330 may also identify or include the device identifier 328 for the client 165. In some embodiments, the token issuer 326 may also generate an initial refresh token 332 in conjunction with the access token 330. The refresh token 332 may permit the client 165 (or the application 304) to obtain another access token 330 for a defined duration of time. The obtaining of the access token 330 may be subsequent to the expiration of the previous access token 330. The defined duration of time for the refresh token 332 may be longer than the defined duration of time for the access token 330, and may, for example, range from two days to a month or a quarter relative to time of issuance. The refresh token 332 may also identify or include the device identifier 328 for the client 165. Upon generation, the token issuer 326 may provide the access token 330 (and the refresh token 332 if generated) to the client 165. The application 304 on the client 165 may store and maintain the access token 330 (and the refresh token 332) on the client 165 for accessing the application service 308.

In addition, the application 304 may send, provide, or transmit an enrollment request to the endpoint management service 312 to enroll the client 165 (or the application 304). In some embodiments, the generation and transmission of the enrollment request may be in accordance with the instructions included in the registration acknowledgement from the device registration service 310. The enrollment request may be to enlist or register the client 165 as having installed the application 304 that relies on resources hosted on one of the application services 308 of the control plane 306. In addition, the enrollment request may be to sign up the client 165 for enterprise security policies specified by the application service 308 or the control plane 306 serving the application services 308. In generating, the application 304 may include the device identifier 328 for the client 165 into the enrollment request. In some embodiments, the application 304 may use the initial identifier as the device identifier 328. Once generated, the application 305 may transmit the enrollment request to the endpoint management service 312.

In turn, the endpoint management service 312 may identify or otherwise receive the enrollment request from the application 304 of the client 165. Upon receipt, the endpoint management service 312 may parse the enrollment request to identify the device identifier 328 for the client 165. In some embodiments, the device identifier 328 may be the one generated and provided by the device registration service 310. In some embodiments, the endpoint management service 312 may use the initial identifier in the enrollment request as the device identifier 328 for enrollment. With the identification, the endpoint management service 312 may register the client 165 referenced by the device identifier 328 with the application service 308 or the control plane 306 serving the application services 308. The endpoint management service 312 may store and maintain the enrollment on the database 316. In storing and maintaining, the endpoint management service 312 may add the device identifier 328 as enrolled onto the database 316.

With the enrollment, the endpoint management service 312 may enforce at least one enterprise security policy in communications between the client 165 and the application service 308 (or the control plane 306). The enterprise security policy may include one or more compliance factors, such as: permitted networks or network addresses from which the client 165 can access the application service 308; permitted location identifiers from which the client 165 can access the application service 308 (e.g., whether the geographic location is allowed, permitted device configurations for the client 165 (e.g., whether the client 165 is jail broken); permitted configuration on the application 304 (e.g., which versions of the application 304 are allowed); allowed device types for the client 165; and security of the client 165 (e.g., whether there is malware detected on the client 165), among others. The endpoint management service 312 may monitor activities of the client 165 with respect to the application service 308 or the control plane 306. The activities may be recorded or logged using the device identifier 328. In monitoring, the endpoint management service 312 may determine whether the activities of the client 165 are in compliance with the enterprise security policy. The determination may be based on the comparison between the activities detected from monitoring with the specifications of the enterprise security policy. When the activities do not comply with at least one of the specifications of the enterprise security policy, the endpoint management service 312 may indicate the device identifier 328 with a status of noncompliant. Otherwise, when activities comply with the specifications of the enterprise security policy, the endpoint management service 312 may indicate the device identifier 328 with a status of compliant.

Furthermore, the endpoint management service 312 may return, send, or transmit an acknowledgment response to the client 165. The acknowledgment response may indicate that the client 165 is enrolled for accessing the application service 308 (or the control plane 306). The client 165 may in turn receive the acknowledgement response from the endpoint management service 314. The installation process of the application 304 on the client 165 may complete with the receipt of the acknowledgment response for the enrollment.

With completion of the installation process, the application 304 running on the client 165 may provide, send, or transmit a request 336 to access the application service 308 (or the control plane 306). The request 336 may be generated when the application 304 is to rely on resources hosted the application service 308. The resources hosted on the application service 308 may include such data, files, and functionalities to be at least partially run from the application service 308, among others. The application 304 may generate the request 336 to include: the device identifier 328 for the client 165, one or more tokens (e.g., the access token 330 initially provided by the token issuer 326), and metadata, among others. The metadata of the request 336 may include a network address (e.g., Internet Protocol (IP) address or Media Access Control (MAC) address), a location identifier, and a device type corresponding to the client 165, among others. With the generation, the application 304 may transmit the request 336 to access the application service 308 via the cloud computing environment 302.

The application service 308 (or the control plane 306) may in turn identify or receive the request 336 from the client 165. The application service 308 may be dedicated to one application 304 and may host resources for the application 304 running on the client 165. With receipt of the request 336, the application service 308 may parse the request 336 to identify at least the access token 330. As discussed above, the access token 330 may specify the defined time duration during which the client 165 with the access token 330 is permitted to access the application service 308. Based on the access token 330, the application service 308 may determine whether the application 304 running on the client 165 is permitted access. When the defined time duration indicates that the access token 330 is unexpired, the application service 308 may determine that the application 304 is permitted access and may continue to process the request 336. The application service 308 may establish an authenticated session with the client 165 and may provide resources for the application 304. On the other hand, when the defined time duration indicates that the access token 330 is expired, the application service 308 may determine that the application 304 is not permitted access. The application service 308 may also redirect the client 165 to the identity provider 314. In redirecting the client 165, the application service 308 may send or forward the request 336 to the identity provider 314.

The request handler 318 of the identity provider 314 may identify or receive the request 336 from the client 165. In some embodiments, the request handler 318 may intercept the request 336. With receipt, the request handler 318 may parse the request 336 to identify at least the device identifier 328, the access token 330, the refresh token 332 (if any), and the metadata, among others. Upon identifying the tokens, the request handler 318 may determine whether access token 330 is expired. The access token 330 may specify the defined time duration during which the client 165 with the access token 330 is permitted to access the application service 308. In some embodiments, if the access token 330 is determined to be unexpired, the request handler 318 may determine to permit access to the application service 308. The application 304 on the client 165 may then obtain access to the application service 308 using the access token 330. In some embodiments, the request handler 318 may continue to process the refresh token 332. In contrast, if the access token 330 is determined to be expired, the request handler 318 may determine whether the client 165 is to receive a new access token 330' to access the application service 308 for the application 304.

To determine whether the client 165 is to receive the new access token 330', the request handler 318 may determine whether the refresh token 332 is expired. The refresh token 332 may specify the time duration during which the client 165 with the refresh token 332 may be used to obtain the new access token 330'. If the refresh token 332 is determined to be unexpired, the request handler 318 may determine whether to issue a new refresh token 332'. In some embodiments, the request handler 318 may also determine whether the new access token 330' is to be issued to the client 165. In some embodiments, the request handler 318 may determine whether the new access token 330' is to be issued in accordance with an authentication process. The authentication process may define, specify, or include one or more operations executed by the identity provider 314 to issue the new access token 330' to the client 165 when the refresh token 332 is determined to be not yet expired. In some embodiments, the authentication process may also include operations to issue the new refresh token 332' even when the refresh token 332 is determined to be still effective. In some embodiments, the request handler 318 may continue and issue the new access token 330' without the operations under the authentication process.

In contrast, if the refresh token 332 is determined to be expired, the request handler 318 may determine whether to issue a new refresh token 332' to the client 165. In some embodiments, the request handler 318 may determine whether to issue the new refresh token 332' in accordance with a refresh process. The refresh process may define, specify, or include one or more operations executed by the identity provider 314 to issue both the access token 330' and the new refresh token 332' to the client 165, when the refresh token 332 is determined to be expired. The refresh process may differ from the authentication process, in that the refresh process is to determine whether to issue both tokens (e.g., the new access token 330' and the refresh token 332'), as opposed to one token (e.g., the new access token 330'). As discussed above, the refresh token 332 may permit the client 165 to obtain additional access tokens 330 once the previous access token 330 has expired. When the client 165 had not previously received the refresh token 332 from the identity provider 314, the request 336 may lack the refresh token 332. For example, during the installation process, the client 165 may have received the access token 330 but not any refresh tokens 332. In such scenarios, the request handler 318 may determine whether to issue the new refresh token 332'.

In some embodiments, the request handler 318 may transmit an indication to the application 304 on the client 165 to present a prompt for re-authentication in response to the determination that the refresh token 332 is expired (or otherwise unavailable). Upon receipt of the indication, the application 304 on the client 165 may present the prompt for re-authentication. The prompt may include an interface (e.g., a graphical user interface (GUI)) for the user to enter authentication credentials (e.g., the account identifier and a passcode). The prompt may also indicate to the user that the user is to be re-authenticated for accessing the application service 308. With entry on the prompt, the client 304 may transmit the authentication credentials to the identity provider 14. In turn, the request handler 318 may receive the authentication credentials from the client 304. The authentication credentials may be used as part of additional verification in determining whether to issue the refresh token 332.

In response to the request 336 to access, the variable generator 320 of the identity provider 314 may calculate, determine, or generate at least one variable 338 (sometimes herein referred to generally as a value). The variable 338 may include an arbitrary value, such as a cryptographic nonce, an initialization vector, a starting value, a cryptographic hash value, or a digital digest, among others. The variable 338 may be used to authenticate or verify the client 165 (or the application 304) for issuance of new tokens. In some embodiments, the variable generator 320 may use a pseudo-random number generator to generate the variable 338. In some embodiments, the variable generator 320 may generate the variable 338 in accordance with an authentication protocol or an encryption algorithm, such as a cryptographic hash function, a password authentication protocol, or a stream cipher, among others. Upon generation, the variable generator 320 may provide, send, or transmit the variable 338 to the client 165. In some embodiments, the generation or transmission of the variable 338 may be in response to determining that the client 165 is to receive the new access token 330'. In some embodiments, the generation or transmission of the variable 338 may be in response to determining to continue processing the request 336.

The application 304 running on the client 165 may identify or receive the variable 338 from the identity provider 314. In response, the application 304 may calculate, determine, or generate at least one signature 340 (sometimes herein referred to as a digital signature). The signature 340 may be generated based at least on the variable 338 received from the identity provider 314, the device identifier 328 for the client 165, and an encryption key (e.g., the private encryption key generated during registration), among others. The generation of the signature 340 may be in accordance with an encryption protocol, such as RSA, the elliptic curve cryptography, a Rabin signature algorithm, among others. In some embodiments, in response to the receipt of the variable 338, the application 304 may identify the device identifier 328 (e.g., the first device identifier 328A on the first client 165A) and the encryption key for the generation of the signature 340. Once generated, the application 304 may provide, send, or transmit the signature 340 to the identity provider 314.

The signature verifier 322 of the identity provider 314 may identify or receive the signature 340 from the client 165. With receipt, the signature verifier 322 may verify the signature 340 in accordance with an encryption protocol using an encryption key (e.g., the public encryption key provided during the registration). The encryption protocol used by the signature verifier 322 to verify may be the same encryption protocol used by the application 304 on the client 165 to generate the signature 340. By verifying, the signature verifier 322 may determine whether signature 340 is authentic and generated by a device (e.g., the client 165) that carries the device identifier 328 and the proper encryption key (e.g., the private encryption key). When the verification of the signature 340 has failed, the signature verifier 322 may return a failure message to the client 165. The signature verifier 322 may terminate the authentication process for obtaining the new access token 330' or the refresh process for obtaining the new access token 330' and the new refresh token 332'.

Conversely, when the verification of the signature 340 is successful, the signature verifier 322 may recover, identify, or determine the device identifier 328 from the signature 340. The signature verifier 322 may determine the device identifier 328 from the signature 340 using the variable 338 generated for the client 165 and encryption key (e.g., the public encryption key). The recovery or determination of the device identifier 328 from the signature 340 may be in accordance with the same encryption protocol as used by the client 165 in generating the signature 340. For example, the signature verifier 322 may decrypt the signature 340 by applying the same encryption protocol as the client 165 together with the variable 338 and the public encryption key. The public encryption key may have been previously generated and provided by the client 165 as part of the registration or enrollment. In some embodiments, the signature verifier 322 may identify the variable 338 generated for the client 165. In some embodiments, the signature verifier 322 may identify the encryption key provided by the client 165. With the identification, the signature verifier 322 may apply the encryption protocol with the variable 338 and the encryption key on the signature 340 to recover the device identifier 328.

The status checker 324 of the identity provider 314 may identify a device compliance status (sometimes referred herein generally as a device status) for the client 165 according to the device identifier 328 determined from the signature 340. The device compliance status may indicate whether the client 165 (or the application 304) is in compliance with the enterprise security policy enforced by the endpoint management service 312. In identifying, the status checker 324 may retrieve or receive the device compliance status from the endpoint management service 312 using the device identifier 328. The status checker 324 may generate a query to include the device identifier 328 to send to the endpoint management service 312. The query may be a request to fetch or retrieve the device compliance status for the client 165 identified by the device identifier 328. With the generation, the status checker 324 may provide, send, or transmit the query to the endpoint management service 312.

The endpoint management service 312 may in turn identify or receive the query from the status checker 324 of the identity provider 314. In some embodiments, the endpoint management service 312 may interface or may be integrated with the identity provider 314 via a common application programming interface (API). Via the API, the endpoint management service 312 and the identity provider 314 may communicate with each other, and the endpoint management service 312 may identify or receive the query from the status checker 324. The endpoint management service 312 may parse the query to identify the device identifier 328. Using the device identifier 328, the endpoint management service 312 may determine the device compliance status for the client 165 in accordance with the enterprise security policy for the application service 308 or the control plane 306 for the application services 308. As discussed above, the endpoint management service 312 may monitor the activities of the client 165 for compliance with the enterprise security policy. From these monitoring of the activities, the endpoint management service 312 may determine that the device compliance status indicates that the client is noncompliant or complaint. The endpoint management service 312 may return, send, or transmit the device compliance status for the client 165 to the status checker 324 of the identity provider 314.

In addition, the status checker 324 may perform additional verification for the device compliance status using the metadata from the request 336, such as the network address, the location identifier, the device type, among others. In some embodiments, the additional verification may be performed under the refresh process. In some embodiments, the status checker 324 may determine whether the metadata satisfies an identity security policy for the application service 308 or the control plane 306 for the application services 308. In some embodiments, the identity security policy may be similar as the enterprise security policy enforced by the endpoint management service 312. The identity security policy, for example, may specify permitted networks or location identifiers from which the client 165 may obtain the new access token 330' or the new refresh token 332'. The identity security policy may also specify permitted device types of clients 165 that are permitted to obtain the new access token 330' or the new refresh token 332'. In some embodiments, the identity security policy may serve to augment the enterprise security policy enforced by the endpoint management service 312. The identity security policy may specify conditions under which the new access token 330' and the new refresh token 332' can be issued. For example, the identity security policy may specify: a maximum number of access tokens 330' allowed to be issued to a client 165 in a defined time window, a maximum number of refresh tokens 332' allowed to be issued to a client 165 in a defined time window, a maximum number of devices that can share the same access token 330 or refresh token 332, among others.

In determining, the status checker 324 may compare the metadata with the specifications of the identity security policy. When the metadata do not satisfy the specifications of the identity security policy, the status checker 324 may determine or identify the device compliance status as incompliant. The identification in accordance with the identity security policy may override the identification of the device compliance status by the endpoint management service 312. On the other hand, when the metadata satisfies the specification of the identity security policy, the status checker 324 may determine or identify the device compliance status as complaint. The identification in accordance with the identity security policy may be overridden by the identification of the device compliance status by the endpoint management service 312. The identification of the device compliance status by the endpoint management service 312 as noncompliant may take precedence over the identification using the identity security policy as noncompliant. This may be because the checking with the identity security policy serves as an augmentation to the checking performed by the endpoint management service 312.

In some embodiments, the status checker 324 may identify previous issuances of the access token 330 or the refresh token 332 to the client 165. The issuances may be recorded on a log the database 314. Each entry of the log may identify a time stamp at which the access token 330 or the refresh token 332 is provided to the client 165. Each entry of the log may also identify metadata (e.g., network address) corresponding to the device from which the request 338 was received. Based on the time stamps, the status checker 324 may determine a number of issuances of the access token 330 or the refresh token 332 to the client 165. When the number of issuances is greater than the maximum number (for the access token 330 or the refresh token 332), the status checker 324 may determine the device compliance status as incompliant. Conversely, when the number of issuances is less than or equal to the maximum number (for the access token 330 or the refresh token 332), the status checker 324 may determine the device compliance status as complaint. In some embodiments, the status checker 324 may identify a number of clients 165 using the access token 330 or the refresh token 332 in the request using the metadata (e.g., counting different number of network addresses). When the number of devices is greater than the maximum number, the status checker 324 may determine the device compliance status as incompliant. Conversely, when the number of devices is less than or equal to the maximum number, the status checker 324 may determine the device compliance status as complaint.

In some embodiments, the status checker 324 may re-authenticate the user of the application 304 using the authentication credentials (e.g., the account identifier and the passcode) received via the prompt for re-authentication. The re-authentication may be in conjunction with the other additional verification processes mentioned above. The status checker 324 may send a query to the device registration service 310 to determine whether the authentication credentials are valid. The query may include the authentication credentials and the device identifier 328, among others. Upon receipt, the device registration service 310 may determine whether the authentication credentials match with the credentials in the database 316 for the device identifier 328. When the authentication credentials match, the device registration service 310 may re-authenticate the user of the application 304 on the client 165, and may send a valid indicator to the identity provider 314. In response to receiving the valid indicator, the status checker 324 may determine that the user is successfully re-authenticated. The status checker 324 may also determine to issue the new refresh token 332'. Conversely, when the authentication credentials do not match, the device registration service 310 may send an invalid indicator to the identity provider 314. In response to receiving the invalid indicator, the status checker 324 may determine that the re-authentication of the user is unsuccessful. The status checker 324, in conjunction with the request handler 318, may send an indicator to the application 304 on the client 165 to again present a prompt for authentication to the user.

The token issuer 326 of the identity provider 314 may issue or provide the new access token 330' or the new refresh token 332' in accordance with the device compliance status identified for the client 165. When the device compliance status indicates noncompliance of the client, the token issuer 326 may determine that the client 165 (or the application 304) is not permitted to access the service. The token issuer 326 may also restrict or prevent provision of the new access token 330' or the refresh token 332'. In some embodiments, the token issuer 326 may provide, send, or transmit a response 342 indicating noncompliance to the client 165. With the lack of the new access token 330' or the refresh token 332', the application 304 may be restricted from accessing the application service 308 on the control plane 306. With the response 342 indicating the noncompliance, the application 304 may prompt the user to re-enter authentication credentials to sign into the application service 308, and repeat the operations described above.

On the other hand, when the device compliance status indicates compliance, the token issuer 326 may determine that the client 165 (or the application 304) is permitted to continue to access the service. The token issuer 326 may also determine to provide or issue the new access token 330' or the new refresh token 332' to the client 165. The token issuer 326 may generate the response 342 to include the new access token 330' or the new refresh token 332' to send to the client 165. Under the authentication process, the token issuer 326 may determine to provide the new access token 330' to the client 165. Under the refresh process, the token issuer 326 may determine to provide the new access token 330' and the refresh token 332' to the client 165. As discussed above, the new access token 330' may permit the client 165 to access the application service 308 for the defined time duration without prompting the user to re-enter credential information. Furthermore, the new refresh token 332' may permit the client 165 to obtain subsequent access tokens 330' for the defined time duration also without prompting the user to re-enter credential information. In some embodiments, the token issuer 326 may also determine to provide the refresh token 322' without provision of the new access token 330'. The refresh token 332' may be used to obtain the subsequent new access token 330' via the authentication process. For example, the client 165 and the identity provider 314 may perform the refresh process to obtain the new refresh token 332' and then perform the authentication process to obtain the new access token 330'.

Based on the determination, the token issuer 326 may generate the new access token 330'. The new access token 330' may be generated in a similar manner as the previous access token 330. The new access token 330' may permit the client 165 (or the application 304) to access the application service 308 (or the application services 308 of the control plane 306) for a defined duration of time. The defined duration of time, for example, may range from a minute to a day relative to time of issuance. The new access token 330' may also identify or include the device identifier 328 for the client 165. Upon generation, the token issuer 326 may include the new access token 330' (along with the new refresh token 332' under refresh process) in the response 342 to send the client 165.

The token issuer 326 may also generate a new refresh token 332' in conjunction with the access token 330. The new refresh token 332' may permit the client 165 (or the application 304) to obtain another access token 330' for a defined duration of time. The obtaining of the access token 330 may be subsequent to the expiration of the previous access token 330. The defined duration of time for the new refresh token 332' may be longer than the defined duration of time for the access token 330', and may, for example, range from two days to a month or a quarter relative to time of issuance. The new refresh token 332' may also identify or include the device identifier 328 for the client 165. Upon generation, the token issuer 326 may include the new access token 330 and the new refresh token 332' in the response 342 to send the client 165.

From the identity provider 314, the application 304 running on the client 165 may receive the response 342 including the new access token 330' or the new refresh token 332'. The application 304 may parse the response 342 to identify the new access token 330' or the new refresh token 332'. With the identification, the application 304 may store and maintain the new access token 330' and the new refresh token 332' on the client 165.

Using the new access token 330' the application 304 may establish an authenticated session with the application service 308 (or the control plane 306). For example, the application 304 may generate and send a new request including the new access token 330' to the application service 308 to initiate the session. The application service 308 in turn may respond with an acknowledgment to establish the authenticated session with the application 304. Through the authenticated session, the application 304 may access resources hosted on the application service 308. Subsequently, when the new access token 330' or the new refresh token 332' expires, the application 304, the application service 308, and the identity provider 314 may repeat the above described functionality to retrieve another access token 330' or refresh token 332'.

Figure 4:
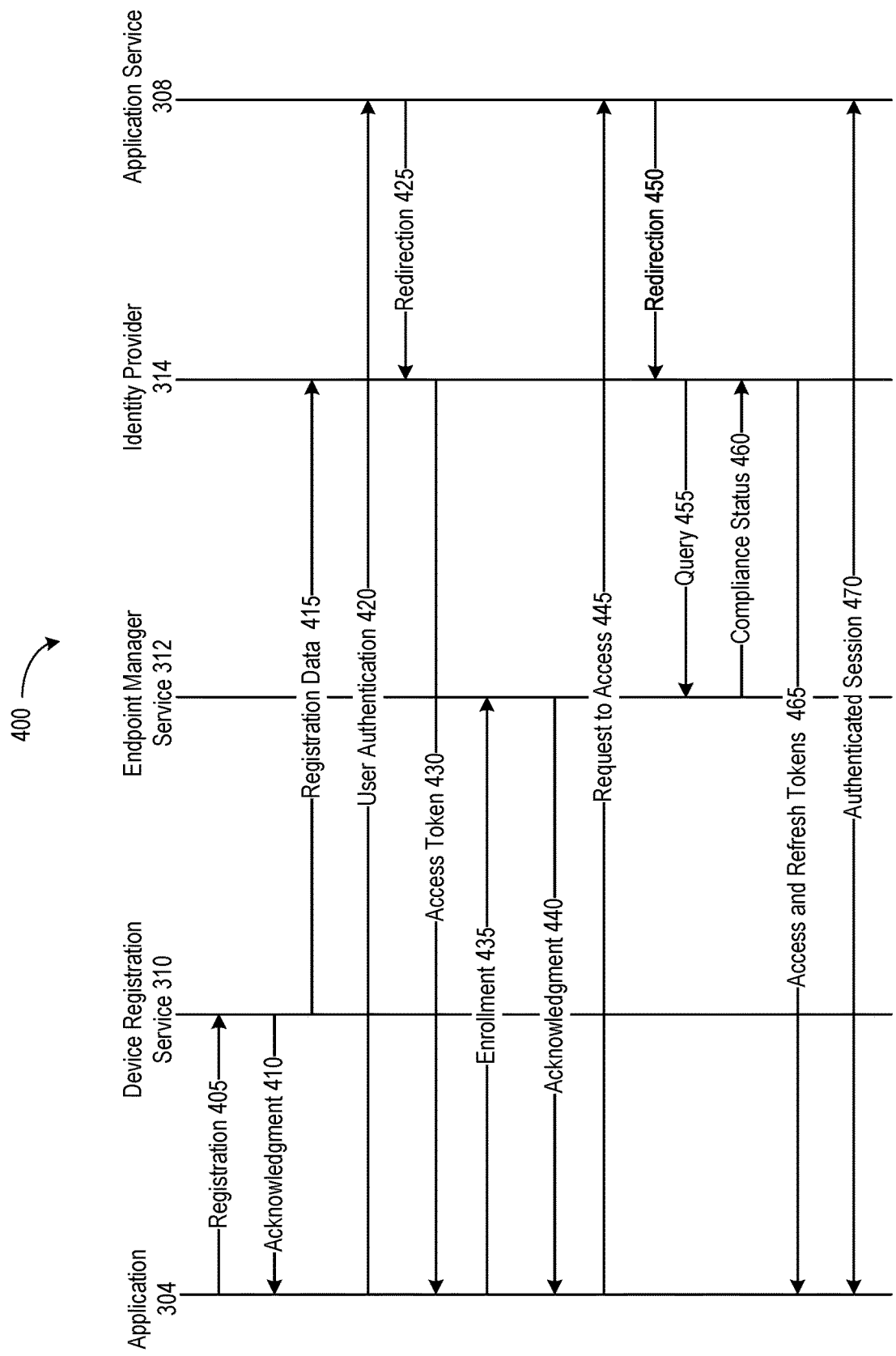
FIG. 4 is a communication diagram of an embodiment for a system for accessing services via identify providers.

Referring now to FIG. 4, depicted is a communication diagram of an embodiment for a process 400 for accessing services via identity providers. Under process 400, as part of the installation, the application 304 on the client 165 may send a registration request including an initial identifier and public encryption key to the device registration service 310 (405). The device registration service 310 may process the registration request and return an acknowledgment including a device identifier 328 for the client 165 to the application 304 (410). In conjunction, the device registration service 310 may provide registration data including the device identifier 328 for the client 165 and a public encryption key to the identity provider 314 (415).

With the receipt of the acknowledgement, the application 304 may be directed to send user authentication credentials to the application service 308 (420). The application service 308 may process the authentication credentials and redirect the application 304 to the identity provider 314 (425). The identity provider 314 may process the user authentication credentials and return an access token 330 to the application 304 (430). The application 304 may send an enrollment request including the device identifier 328 to the endpoint management service 312 (435). The endpoint management service 312 may process the enrollment request, store the device identifier 328, and respond with an acknowledgment (440).

Once installed on the client 165, the application 304 may send a request to access resources hosted on the application service 308 associated with the application 304 (445). The application service 308 may redirect the request to the identity provider 314 (450). The identity provider 314 may process the request and query a compliance status using the device identifier 328 for the client 165 to the endpoint management service 312 (455). The endpoint management service 312 may process the query and return the compliance status to the identity provider 314 (460). The identity provider 314 may determine that the client 165 is complaint based on the compliance status, and may issue another access token 330 and a refresh token 332 to the application 304 (465). Using the access token 330, the identity provider 314 may access resources of the application service 308 via an authentication session (470).

Figure 5A:
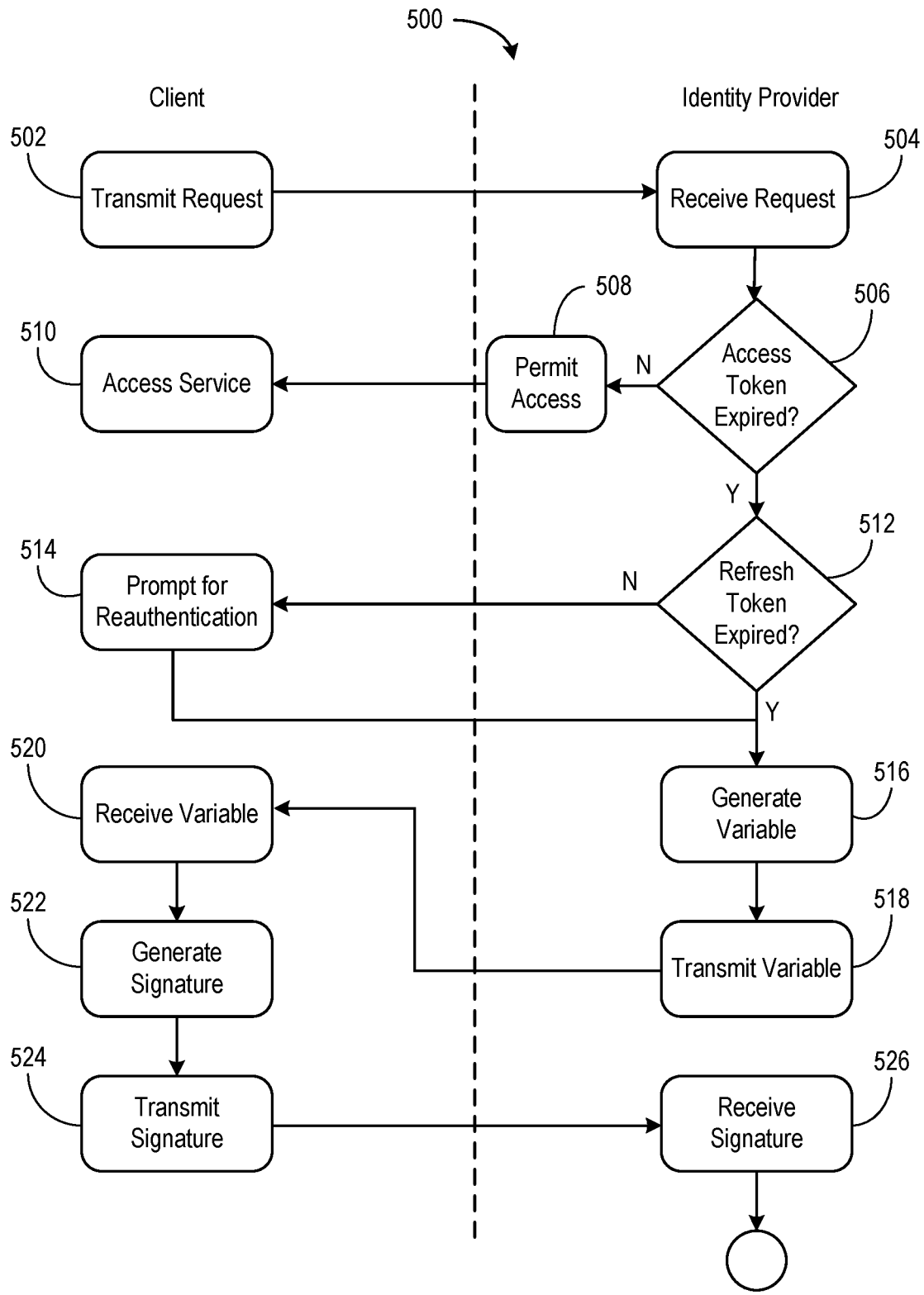
FIGS. 5A and 5B are flow diagram of an embodiment of a method of accessing services via identify providers.
Figure 5B:
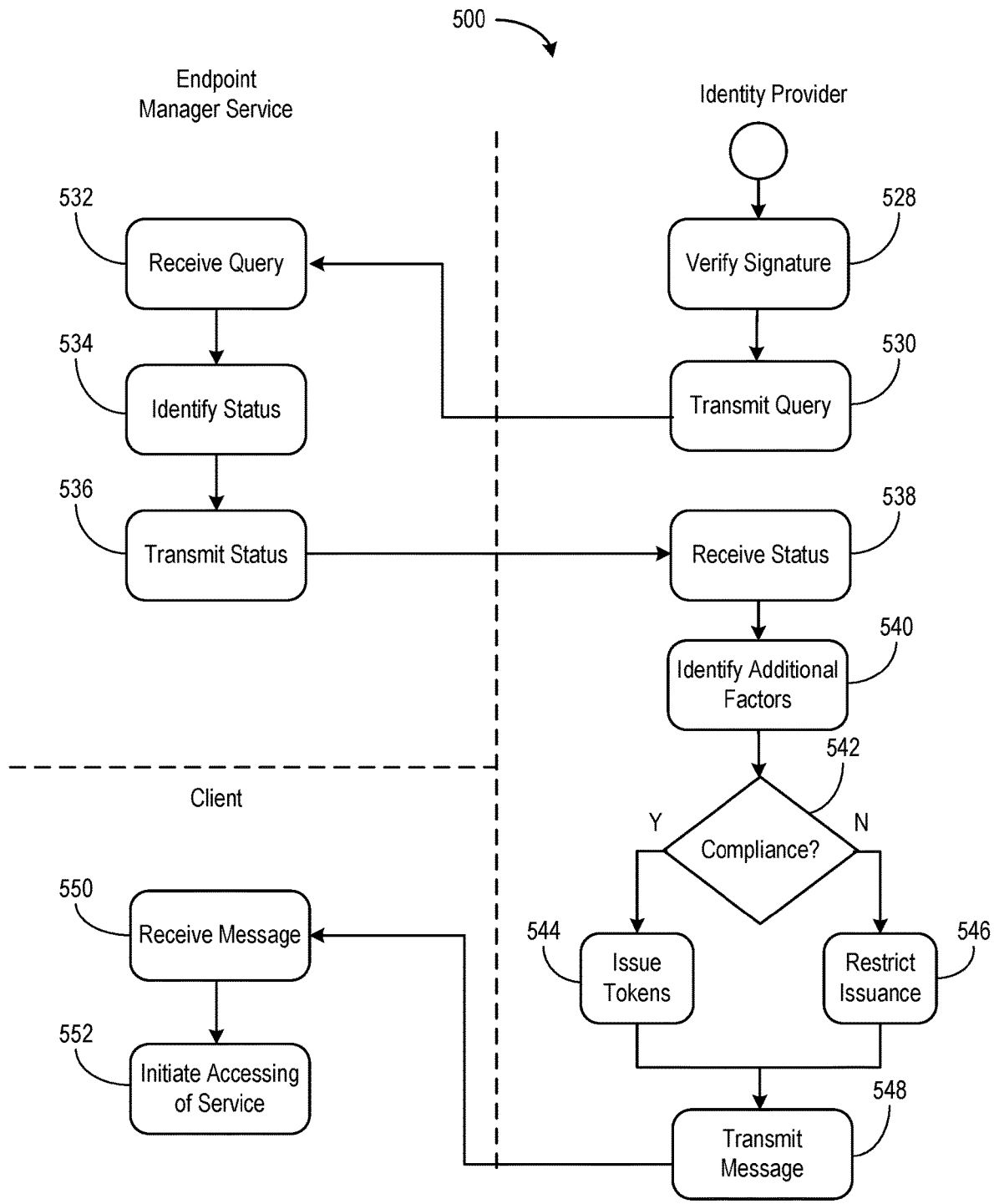

Referring now to FIGS. 5A and 5B, depicted are flow diagram of an embodiment of a method 500 of accessing services via identity providers. The operations and functionalities of the method 500 may be performed by the components described in FIGS. 1A-4, such as the system 300 as detailed herein in conjunction with FIGS. 3 and 4. In detail, a client (e.g., the client 165) may transmit a request (e.g., the request 336) to access to an identity provider (e.g., the identity provider 314) (502). The request may be generated by an application executing on the client attempting to access a resource hosted on an application service (e.g., the application service 308) of a control plane (e.g., the control plane 306). The request may include device identifier (e.g., the device identifier 328) of the client, one or more tokens (e.g., the access token 330 or the refresh token 332), and metadata, among others.

The identity provider may receive the request to access from the client (504). The request to access may be redirected from the application service to the identity provider. Upon receipt, the identity provider may parse the request to identify the device identifier, the one or more tokens, and the metadata. The identity provider may determine whether an access token of the client has expired (506). The access token may permit the client to access the resources hosted on the application service. The access token may identify a duration of time during which the client is permitted to access to the application service.

If the access token is determined to be not expired, the identity provider may permit access (508). The client may access a service (e.g., the application service 308) (510). The client may use the access token to continue accessing the service. If the access token is determined to be expired, the identity provider may determine whether a refresh token of the client is token has expired (512). The refresh token may permit the client to obtain additional access tokens (e.g., the new access token 330'). The refresh token may identify a duration of time during which the client is permitted to obtain additional access tokens. The duration of time identified by the refresh token may be greater than the duration of time identified by the access token. if the refresh token is determined to be expired, the identity provider may cause the client to prompt for re-authentication (516). When the prompt for re-authentication is presented, the user may re-enter authentication credentials (e.g., account identifier and password). Upon entry, the client may provide the authentication credentials to the identity provider.

The identity provider may generate a variable (e.g., the variable 338) (516). The variable may include any arbitrary value, such as a cryptographic nonce used to authenticate the client for issuance of tokens. The identity provider may generate the cryptographic nonce (or a value) in accordance with an encryption algorithm. The identity provider may transmit the variable to the client (518). The client may receive the variable from the identity provider (520). The client may also identify the device identifier for the client and a private encryption key. The private encryption key may have been previously generated by the client as part of registration or enrollment. The client may generate a signature (e.g., the signature 340) (522). The client may use the variable, the device identifier, and the private encryption key to generate the signature. The client may transmit the signature to the identity provider (524). The identity provider may receive the signature (526).

The identity provider may verify the signature (528). Upon receipt, the identity provider may authenticate or verify the signature using a public encryption key. The public encryption key may have been previously provided to the identity provider by the client as part of the registration or enrollment. With the verification of the signature, the identity provider may recover the device identifier from the signature using the public encryption key and the variable. The identity provider may transmit a query to an endpoint manager service (e.g., the endpoint management service 312) (530). The query may include the device identifier recovered from the signature generated by the client.

The endpoint manager service may receive the query from the endpoint manager service (532). The endpoint manager may parse the query to identify the device identifier for the client. Using the device identifier, the endpoint manager may have monitored the activities of the client to determine compliance with a security policy for the application service. The endpoint manager service may identify a device compliance status (534). The device compliance status may indicate whether the client is in compliance with the security policy. From monitoring, the endpoint manager service may determine whether the activities are in compliance with the specifications of the security policy. When not complaint, the endpoint manager service may identify the device compliance status as noncompliant. Conversely, when compliant, the endpoint manager service may identify the device compliance status as complaint. The endpoint manager service may transmit the device compliance status to the identity provider (536).

The identity provider may receive the device compliance status from the endpoint manager service (5438). The identity provider may identify additional factors (540). The additional factors may include the authentication credentials received from the client. The additional factors may also be identified from the metadata of the request, such as the network address, the location identifier, and the device type of the client. The identity provider may compare the additional factors to a security policy. The identity provider may determine whether the device compliance status is complaint or incompliant (542). The determination may be based on the device compliance status received form the endpoint manager service.

If the device compliance status is determined to be complaint, the identity provider may issue tokens (544). The identity provider may generate a new access token and a new refresh token. The new access token may specify a new duration of time during which the client is permitted to access the application service. The new refresh token may specify a new duration of time during which the client can obtain subsequent access tokens. The tokens may be included in a message (e.g., the response 342) to be provided to the client. Conversely, if the device compliance status is determined to indicate that the client is noncompliant, the identity provider may restrict issuance of the tokens (546). The identity provider may include an indication of noncompliance in the message to be provided to the client. The identity provider may transmit a message to the client (548).

The client may receive the message from the identity provider (550). The client may parse the message. When the device compliance status was identified as indicating that the client is complaint, the client may parse the message to identify the tokens. On the other hand, when the device compliance status was identified as indicating noncompliance, the client may parse the message to identify the indication of the noncompliance. The client may initiate accessing of the service (552). When tokens are present in the response, the client may use the access token to establish an authenticated token to access the resources of the application service. On the other hand, when the indication of noncompliance, the client may prompt the user to re-enter authentication credentials.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
    determining, by a computing device, responsive to a request from a client of a group to access a service, that a refresh token issued to the client for obtaining an access token is unexpired;
    transmitting, by the computing device, responsive to determining that the refresh token is unexpired, a value to the client, the client configured to access the service using the access token;
    receiving, by the computing device from the client, a signature, the signature generated using the value, a device identifier, and a first encryption key;
    verifying, by the computing device, the signature from the client using a second encryption key;
    determining, by the computing device using the value and the second encryption key, the device identifier from the signature responsive to verification of the signature;
    identifying, by the computing device, a status of the client as compliant with a rule of the group to permit access to the service, using the device identifier; and providing, by the computing device responsive to identifying the status of the client as compliant, the access token to the client.

2. The method of claim 1, comprising issuing, by the computing device, the access token to the client for accessing the service responsive to the status indicating that the client is permitted to access the service.

3. The method of claim 1, comprising providing, by the computing device responsive to the status, the access token and the refresh token, the access token permitting the client to access the service for a defined duration of time, and the refresh token permitting the client to obtain another access token after expiration of the access token.

4. The method of claim 1, comprising preventing, by the computing device responsive to the status indicating that the client is noncompliant, provision of a refresh token, the refresh token permitting the client to obtain a second access token.

5. The method of claim 1, comprising transmitting, by the computing device, the value responsive to determining that the access token is expired.

6. A device, comprising:
one or more processors configured to:
  determine, responsive to a request from a client of a group to access a service, that a refresh token issued to the client for obtaining an access token is unexpired;
  transmit, responsive to determining that the refresh token is unexpired, a value to the client, the client configured to access the service using the access token;
  receive, from the client, a signature, the signature generated using the value, the device identifier, and a first encryption key;
  verify the signature from the client using a second encryption key;
  determine, using the value and the second encryption key, the device identifier from the signature responsive to verification of the signature;
  identify a status of the client as compliant with a rule of the group to permit access to the service, using the device identifier; and
  provide, responsive to identifying the status of the client as compliant, the access token to the client.

7. The device of claim 6, wherein the one or more processors are configured to issue a token to the client for accessing the service responsive to the status indicating that the client is permitted to access the service.

8. The device of claim 6, wherein the one or more processors are configured to provide, responsive to the status, the access token and the refresh token, the access token permitting the client to access the service for a defined duration of time, and the refresh token permitting the client to obtain another access token after expiration of the access token.

9. The device of claim 6, wherein the one or more processors are configured to prevent, responsive to the status indicating that the client is noncompliant, provision of the refresh token, the refresh token permitting the client to obtain a second access token.

10. The device of claim 6, wherein the one or more processors are configured to transmit the value responsive to determining that the access token is expired.

11. A method comprising:
determining, by a computing device, responsive to a request from a client of a group to access a service, that a first refresh token issued to the client for obtaining a first access token is unexpired;
transmitting, by the computing device, responsive to determining that the first refresh token is unexpired, a value to the client, the client configured to access the service using a first access token;
receiving, by the computing device from the client, a signature, the signature generated using the value, a device identifier, and a first encryption key;
verifying, by the computing device, the signature from the client using the second encryption key;
determining, by the computing device using the value and a second encryption key, the device identifier from the signature responsive to verification of the signature;
identifying, by the computing device, a status of the client as compliant with a rule of the group to permit access to the service, using the device identifier; and
providing, by the computing device responsive to identifying the status of the client as compliant, a second refresh token to permit the client to obtain a second access token to replace the first access token to access the service.

12. The method of claim 11, comprising providing, by the computing device responsive to the status, both the second refresh token and the second access token to permit the client to access the service for a defined duration of time.

13. The method of claim 11, comprising verifying, by the computing device, the status of the client in accordance with one or more conditions allowing issuance of the second refresh token.

14. The method of claim 11, comprising querying, by the computing device, a management service using the device identifier to identify the status of the client.

* * * * *